United States Patent [19]
Watanabe

[11] Patent Number: 5,157,772
[45] Date of Patent: Oct. 20, 1992

[54] DATA BUS ARRANGEMENT WITH IMPROVED SPEED AND TIMING

[75] Inventor: Nobuhisa Watanabe, Kanagawa, Japan

[73] Assignee: Sony Corporation, Japan

[21] Appl. No.: 192,362

[22] Filed: May 10, 1988

[30] Foreign Application Priority Data

May 14, 1987 [JP] Japan .................. 62-117509

[51] Int. Cl.⁵ .................................. G06F 1/00
[52] U.S. Cl. ........................... 395/325; 364/DIG. 1
[58] Field of Search ... 364/200 MS File, 900 MS File; 365/203; 307/239, 571, 582; 395/325

[56] References Cited

U.S. PATENT DOCUMENTS

| | | | |
|---|---|---|---|
| 3,765,002 | 10/1973 | Basse | 364/200 |
| 3,938,094 | 2/1976 | Caudel | 364/200 |
| 4,222,103 | 9/1980 | Chamberlin | 364/200 |
| 4,314,353 | 2/1982 | Gunter et al. | 364/900 |
| 4,503,494 | 3/1985 | Hamilton et al. | 364/200 |
| 4,545,038 | 10/1985 | Bellay et al. | 365/189.01 |
| 4,556,961 | 12/1985 | Iwahashi et al. | 365/194 |
| 4,651,036 | 3/1987 | Tallaron | 307/571 |
| 4,686,396 | 8/1987 | Law et al. | 307/571 |
| 4,757,215 | 7/1988 | Szo | 307/582 |
| 4,777,623 | 10/1988 | Shimazu et al. | 307/571 |
| 4,945,267 | 7/1990 | Galbraith | 307/571 |

OTHER PUBLICATIONS

IBM Technical Disclosure Bulletin, vol. 18, No. 4, Sep. 1975, pp. 1026-1027, F. R. Rossi: "End of Bit Line Sensing System".
E.D.N. Electrical Design New, vol. 31, No. 21, Oct. 1986, pp. 162-172, 174, 176, J. Titus: "Special Report: DSP ICs", p. 165, right-hand col., FIG. 2.

*Primary Examiner*—Stuart S. Levy
*Assistant Examiner*—Rebecca L. Rudolph
*Attorney, Agent, or Firm*—Ronald P. Kananen

[57] ABSTRACT

To speed up data transfer, one embodiment of the invention features a transmission gate arrangement which pre-charges and transfers data in internal and external buses with the same timing and which further initializes the internal bus and a device such as an ALU, every bus cycle. A second embodiment speeds the data transfer in the buses by providing two data transfer paths through the interconnected buses and reducing the combined resistances of the internal and external buses.

8 Claims, 5 Drawing Sheets

DATA BUS ARRANGEMENT WITH IMPROVED SPEED AND TIMING

BACKGROUND OF THE INVENTION

1. Field of the Invention

The present invention relates generally to a microcomputer and more specifically to a data bus arrangement which improves the speed with which data can be moved within the system.

2. Description of the Prior Art

Currently-used microcomputers inevitably include on a single silicon chip, a central processing unit CPU, a read only memory ROM, a random access memory RAM, an input output interface I/O, and a timer or clock circuit.

The CPU of such devices includes a register, an arithmetical unit (ALU), and an internal data bus which is used to transfer data between the two. These devices further include an external data bus which is used in conjunction with the internal bus to move data to peripheral circuits.

FIG. 1 shows an example of how the currently-used prior art devices have managed the movement of data.

Data from the internal register of the CPU is inputted to the ALU and subsequently processed. The result is latched in a temporary register. This data is then transferred to the internal data bus, latched in an output data latch and outputted therefrom to the external data bus. The data appearing on the output terminal of the chip is transferred into a memory located eternally of the chip on which the CPU and ALU are formed.

FIG. 2 depicts the number of bus cycles required to achieve the above mentioned data transfer. In the first half of the first bus cycle (nth bus cycle) data from the internal register is inputted to the ALU. In the latter half of the same cycle, data is processed and, at the same time, the internal bus is precharged. During the first half of the next cycle (viz., the n+1 cycle) the temporary charge is stored by temporarily latching the same. During the second half of this cycle, data is outputted to the external bus, and in the first half of the n+2 cycle, the data is written into an external memory.

Thus, as will be clear, there is a full bus cycle between the one in which data is inputted to the ALU and the one in which data from the CPU is actually written into memory. In this case, the result from the ALU is determined during the first half of the n+1 cycle but even though the processing is complete a total of three full bus cycles are required to transfer the data.

In addition to the above, the currently used devices have included circuit arrangements such as shown in FIG. 3. In this figure, numeral 1a denotes a ROM, and numerals 2a, 2b, 2c and 2d denote internal function registers which act as a program counter, a common use register, a stack pointer, an accumulator, and a program status word, respectively. These internal function registers 2a-2d are connected by way of an internal data bus 3, a data buffer 4, and an external bus 5 to a peripheral function register 6.

The data contained in these internal function registers 2a-2d is transferred to the peripheral function register 6 through the above mentioned internal bus 3, the data buffer 4 and the external bus 5, while in the reverse instance the data in the peripheral function register is supplied via the same path.

However, with this type of arrangement, the rate at which the bus can actually move data is insufficiently high to meet high speed processing requirements and hampers the attainment of currently required data speed handling and management targets.

SUMMARY OF THE INVENTION

It is an object of the present invention to provide a system which enables increased data transfer speed using simple hardware arrangements.

In brief, to speed up data transfer, one embodiment of the invention features a transmission gate arrangement which pre-charges and transfers data in internal and external buses with the same timing and which further initializes the internal bus and a device such as an ALU, every bus cycle. A second embodiment speeds the data transfer in the buses per se by providing two data transfer paths through the interconnected buses and reducing the combined resistances of the internal and external buses on the order of 50%.

More specifically, a first aspect of the present invention is in the form of a microcomputer which comprises a CPU. The CPU includes a calculation unit and an internal bus. An external bus is operatively connected with the internal bus and a transmission gate means for pre-charging and transferring data into the internal bus and the external bus with the same timing, and for initializing the calculation unit and the internal bus on every bus cycle.

A second aspect of the invention is in the form of a microcomputer which features: a CPU, the CPU including a first register and an internal bus, the internal bus having first and second ends; an external bus having first and second ends, the first end being connected with the first end of the internal bus and the second end being connected with the second end of the internal bus; a second register operatively connected with the external bus; and transmission gate means for transferring data between the first and second registers via the internal and external buses.

A further aspect of the invention is in the form of a microcomputer which features: a CPU, the CPU including a ALU and an internal bus, the internal bus having first and second ends; an external bus, the external bus having first and second ends, the first end of the external bus being connected to the first end of the internal bus, and the second end of the internal bus being connected to the second end of the external bus; and transmission gate means for pre-charging and transferring data into the internal bus and the external bus with the same timing, and for initializing the ALU and the internal bus on every bus cycle.

BRIEF DESCRIPTION OF THE DRAWINGS

The various features merits and advantages of the instant invention will become more clearly appreciated from a description of the preferred embodiments of the same, taken in conjunction with the appended drawings in which.

DESCRIPTION OF THE PREFERRED EMBODIMENTS

Figure 1:
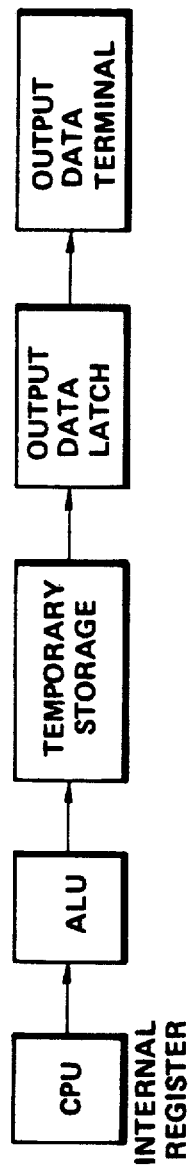
FIG. 1 is a block diagram depicting the operations performed by a prior art arrangement discussed in the opening paragraphs of the instant disclosure.
Figure 2:
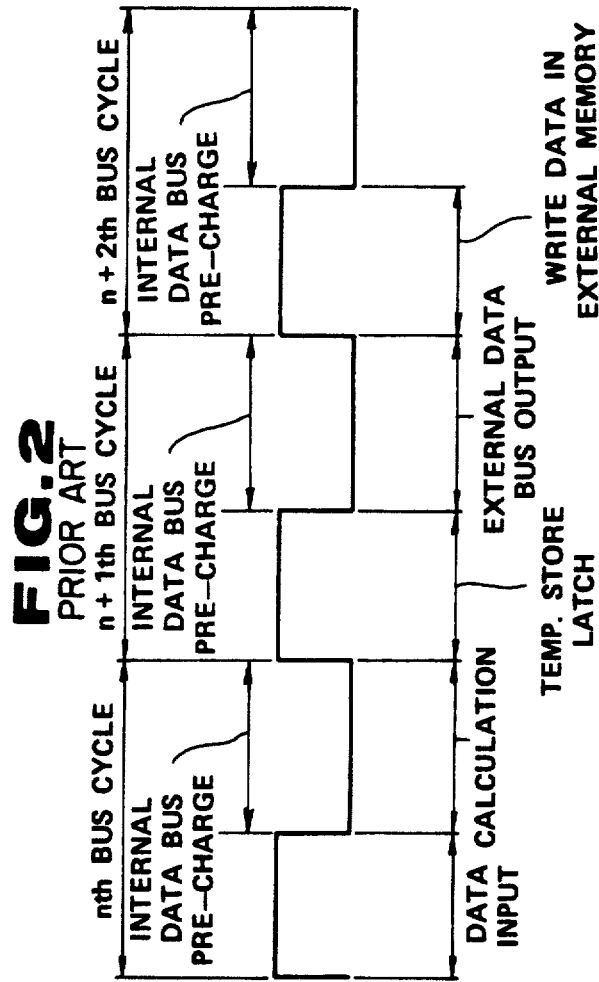
FIG. 2 is a timing chart showing the stages involved in moving data from a CPU to an external memory.
Figure 3:
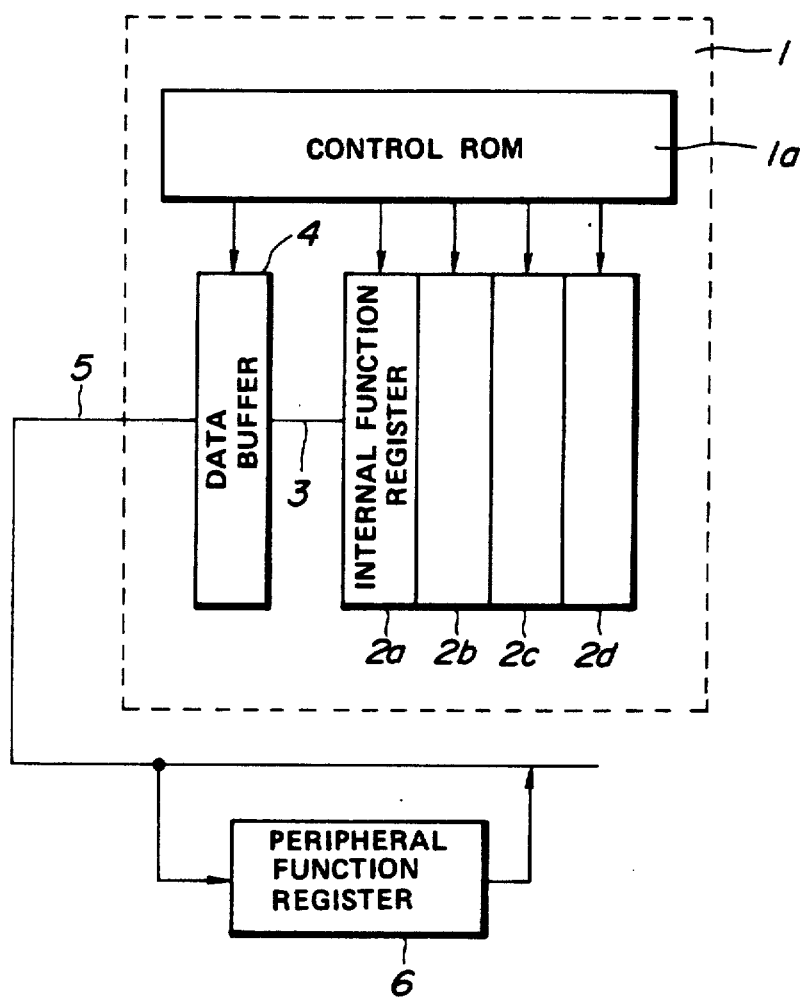
FIG. 3 is a circuit diagram showing a prior art circuit arrangement which has also been discussed in the opening paragraphs of the instant disclosure.
Figure 4:
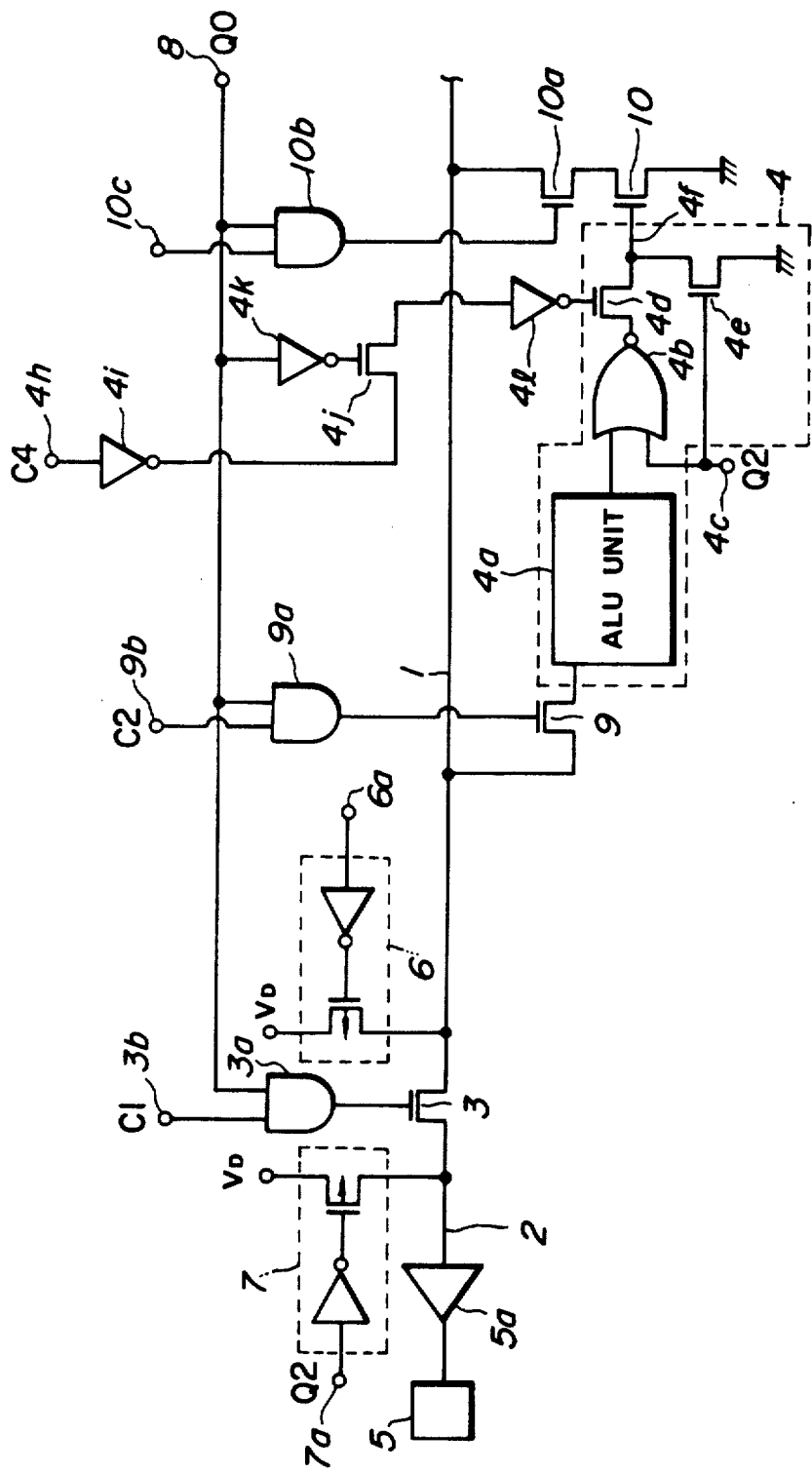
FIG. 4 is circuit diagram showing the arrangement which characterizes a first embodiment of the instant invention.

FIG. 4 shows a circuit arrangement which characterizes a first embodiment of the present invention. In this figure, the CPU internal bus 1 and the external data bus 2 are connected by a transmission gate formed of n-channel MOS-FET 3. This transmission gate 3 is connected to the output of an AND circuit 3a. One of the input terminals 3b of this AND circuit 3a is supplied with a control signal C1 which is produced by control circuit of the microcomputer which will be described hereinlater with reference to FIG. 2c, while the other input terminal is supplied with a bus cycle pulse signal Q0 of the nature shown in curve A in FIG. 5 and which is applied to the pulse cycle input terminal 8.

The external bus 2 is connected to a buffer circuit 5a which is connected to an output terminal 5. The internal and external buses 1 and 2 are respectively connected with precharge circuits 6 and 7 in a manner to be supplied with a precharge voltage VD. The precharge circuits 6 and 7 have input terminals 6a and 7a respectively which are supplied with control signals in form of a second bus cycle clock pulse signal Q2 of the nature shown in the curve B in FIG. 5. When this signal assumes a high level "1", the internal and external data buses 1 and 2 precharge and assume a high level by way of example.

Figure 5:
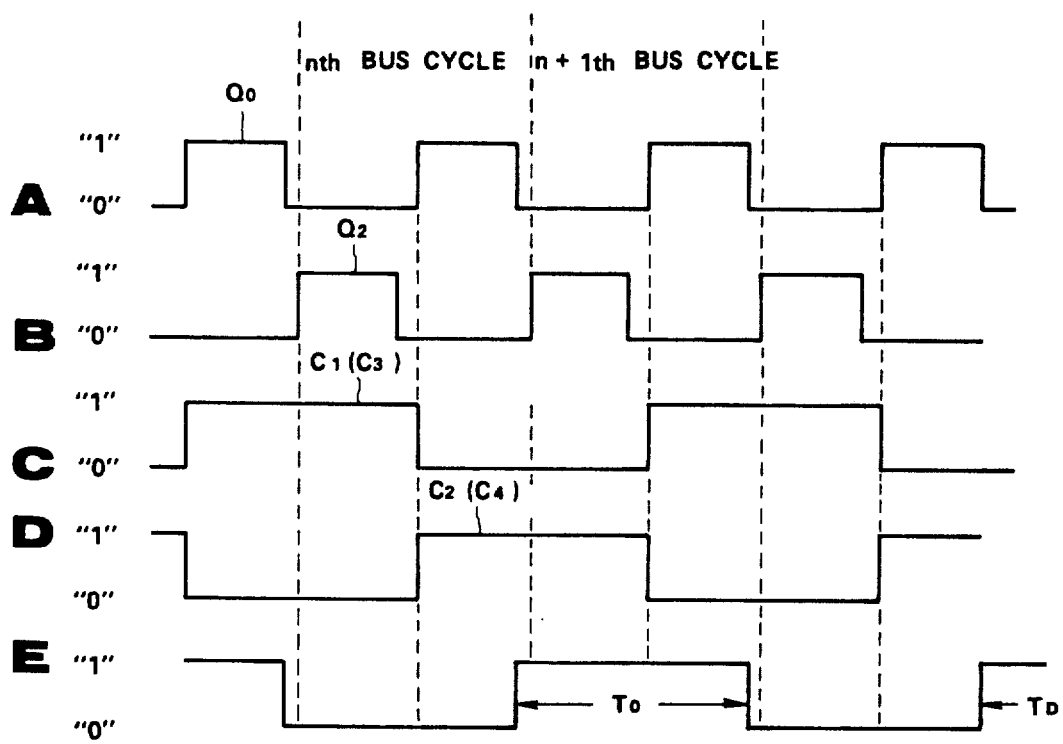
FIG. 5 is a timing chart showing the various signals which are produced and/or utilized during the operation of the circuit shown in FIG. 4.

In the instant arrangement, the bus cycle pulses Q0 and Q2 are arranged to have the same period (viz, the same bus cycle time) and are arranged so that, as shown by curves A and B in FIG. 5, when one assumes a high level "1" the other assumes a low level "0" and vice versa.

The control signal C1, shown at curve C in FIG. 5, is arranged so that during the n−1th cycle, it assumes a high level at timing coincident with the leading edge of the Q0 signal and remains at a high level until the next leading edge of the Q0 signal appears in the nth cycle. Accordingly, signal C1 is such as to rise to a high level in every other bus cycle.

The internal bus 1 is connected to the ALU unit 4a by way of an n-channel MOS-FET 9. In this instance, the internal bus 1 is connected to the drain of the MOS-FET 9 while the source thereof is connected with the input terminal of the ALU. The gate of the MOS-FET 9 is connected to the output of an AND circuit 9a. One of the input terminals (viz., terminal 9b) of the AND circuit 9a is arranged to receive a control signal C2 of the nature shown at curve D in FIG. 5. The signal C2 is produced by the control circuit of the microcomputer. On the other hand, the other input terminal of the AND circuit 9a is arranged to receive the bus cycle clock pulse signal Q0 from the pulse cycle input terminal 8.

As shown by curve D in FIG. 5 the second control signal C2 is arranged to assume a low level when the signal C1 assumes a high level and vice versa.

Accordingly, the MOS-FET 9 is arranged to assume an ON state when the bus cycle clock pulse signal Q0 assumes a high level.

The ALU unit 4a is arranged so that an output terminal thereof is connected with one of the inputs of a NOR gate circuit 4b. The other input terminal of the NOR gate 4b is connected with a terminal 4c which is supplied with the second bus cycle clock pulse signal Q2. The output of the NOR gate 4b is connected with a drain of n-channel MOS-FET 4d. The source of this MOS-FET 4d is connected with the gate of a MOS-FET 10. Further, in the instant arrangement, the source of a MOS-FET 4d is connected with a drain of a MOS-FET 4e which forms part of the initialization circuit. The source of the MOS-FET 4e is grounded at 4g while the gate thereof is connected with the terminal 4c.

The node 4f which is defined between the MOS-FET 4d, MOS-FET 4e and MOS-FET 10 is such as to develop a low level "0" when the second bus cycle clock pulse signal Q2 assumes a high level "1".

A terminal 4h associated with an inverter 4i is supplied with a fourth control signal C4. This signal is identical to signal C2 as shown in curve D in FIG. 5. This signal is supplied by way of inverter 4i to the drain of a n-channel MOS-FET 4j. The source of this MOS-FET 4j is connected by way of an inverter 4l to the gate of MOS-FET 4d.

The first bus cycle clock signal input terminal 8 is connected by way of an inverter 4k to the gate of the MOS-FET 4j. Accordingly, with this arrangement, the signal shown in curve E of FIG. 5 is produced. As shown, this signal is such as to assume a high level in the n-1th cycle until the occurrence of the trailing edge of signal Q0. The signal remains at a low level "0" until such time as the next trailing edge of the signal Q0 occurs just prior the end of the nth cycle. Following this, the signal remains at a high level "1" until such time as the next trailing edge of the signal Q0 occurs in the n+1 cycle.

The source of the MOS-FET 10 is grounded while the drain is connected to the source of n-channel MOS-FET 10a. The drain of the MOS-FET 10a is connected to the internal bus 1 while the gate thereof is connected with the output of an AND circuit 10b. One input of the AND circuit 10b is connected with an input terminal 10c which is adapted to receive a control signal C3 of the nature shown at curve C in FIG. 5. The other input of the AND gate 10b is connected to the terminal 8 so as to receive the first bus cycle clock signal Q0. With this arrangement, when signal Q0 assumes a high level "1", the MOS-FET 10a is induced to assume an ON state.

As the remaining construction and arrangement of the circuit shown in FIG. 4 is essentially the same as found in conventional arrangements, a detailed explanation of the same will be omitted for brevity.

With the above described arrangement, during the first half of the nth bus cycle when signal Q2 assumes a high level "1", the MOS-FET 4e is rendered ON and the signal appearing on node 4f assumes a low level. This causes the ALU to be initialized. Following this, in the last half of the nth cycle, while signal Q0 remains at high level "1", the MOS-FET input gate 9 is maintained ON and during this period, the data in the internal register of the CPU (not shown) is inputted to the ALU. In addition to this, the MOS-FET 4d is conditioned to assume an ON state and the signal shown in curve E of FIG. 5 rises to a high level "1" until the leading edge of signal Q2 is produced in the n+1th cycle. This maintains the signal in question at a high level for a time To. In response to the signal Q2 assuming a low level "0" in the n+1th cycle, the result produced by the ALU is subject to a timing latching at node 4f.

Next, during the period To in the n+1th cycle the MOS-FET 4d is ON, and while the signal Q0 is at a high level "1" the MOS-FET 10a is rendered ON, so that the data indicative of the result of the ALU processing is transferred through the MOS-FET 10a, the internal bus 1, the transmission gate 3, the external bus 2 and the buffer circuit 5a to the output terminal 5.

While the bus cycle clock pulse signal Q2 is at a high level "1", the node 4f is initialized via discharge. Viz., when the MOS-FET 4d transmission gate is ON, the signal appearing on the node 4f becomes "0" with the result that the adjacent MOS-FET 4d goes ON. This induces the signal appearing at the node 4f to either remain at a low level "0" or change from "1" to "0". As a result, the MOS-FET 10a is ON and data is transferred to the data bus 1 before the outcome of the ALU processing, so that it is not required to pre-charge the internal data bus 1.

Accordingly, during the above mentioned n+1th bus cycle the data latched on the node 4f is directly transferred to the internal and external data buses 1 and 2 and driven to the output terminal 5, thus rendering it possible to achieve the required data management in two data bus cycles. This of course reduces the number of bus cycles required and enables the desired tasks to be achieved in a shorter time. Further, with the instant arrangement, as the internal and external data buses are subject to the same timing, and as data is being transferred it is not necessary to perform individual data input and output latches between the input and output buses, and it is possible to omit the pre-charging operations. This permits an advantageous simiplication in hardware.

Figure 6:
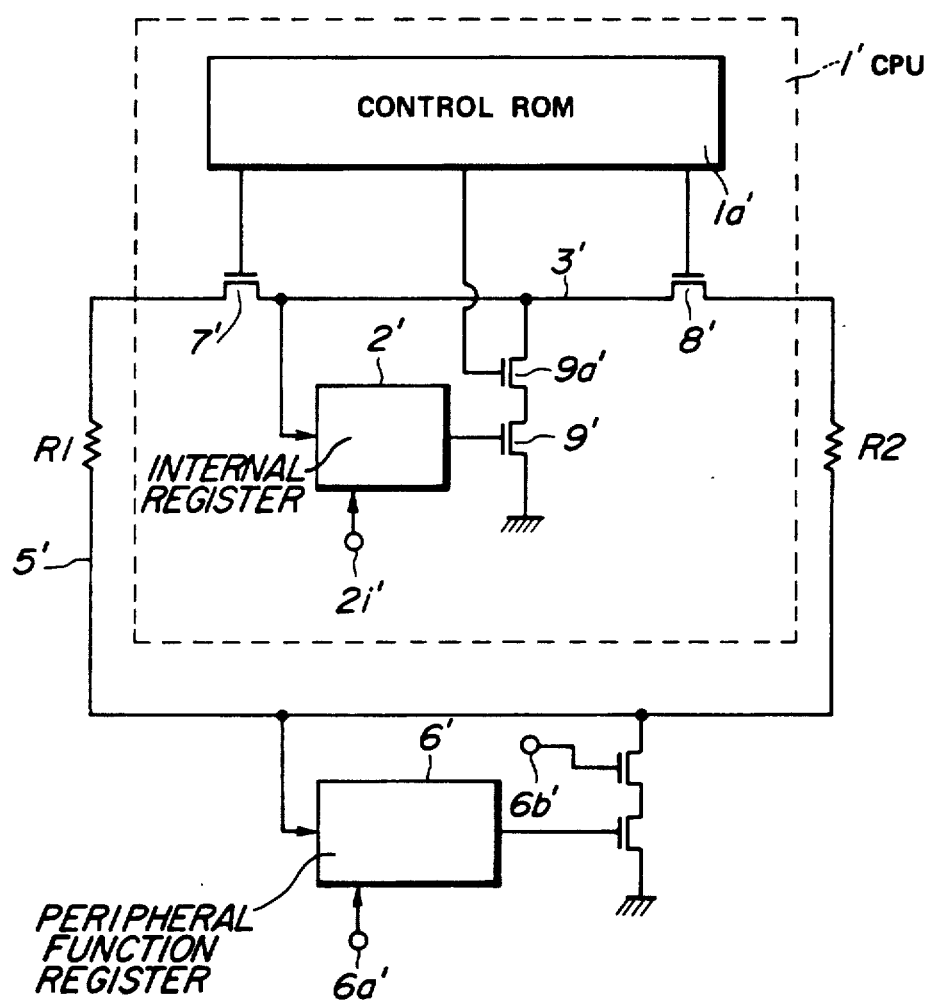
FIG. 6 is a circuit diagram of a second embodiment of the present invention.

FIG. 6 shows a second embodiment of the present invention. In this figure, for the sake of clarity, only a single register 2' is illustrated. However, it is to be understood that this single unit is representative of devices such as a program counter, stack pointer, accumulator, and program password type registers.

As shown, the internal register is connected with an internal data bus 3' and with the gate of a MOS-FET 9'. The source of the MOS-FET 9' is connected to the source of another MOS-FET 9a'. The drain of the latter mentioned MOS-FET is connected to the internal data bus 3' while the gate of the same is connected with a ROM in a manner to be supplied with a predetermined control signal. Viz., when the MOS-FET 9a is ON, the data in the internal register 2' is supplied to the internal data bus 3'. In this figure, the terminal 2i' is arranged to function to receive a signal which indicates that data is to be written into the internal register 2'. In this arrangement, the input terminal 2i' is operatively connected with the ROM 1a' in a manner to receive said predetermined signal.

In the instant arrangement, the internal data bus 3' is provided with two transmission gates 7' and 8'. Both are formed of n-channel MOS-FET's. The drain of the gate 7' and the source of the gate 8 is connected to the "outboard portions" of the internal bus 3' while the source of gate 7' is connected to the drain of gate 8' through the portion of the bus extending therebetween. A peripheral function register 6' is connected in parallel with an external bus 5' in a manner to be operatively connected with the gates 7' and 8' in the illustrated manner.

The peripheral function register 6' is provided with a terminal 6a' which is adapted to receive a read control signal from the ROM. This device is also provided with a terminal 6b' is adapted to receive a read out control signal.

It will be noted that in this drawing the internal and external data buses are illustrated by a single line, however, this is only for the sake of illustration. In an 8 bit type one chip microprocessor, these buses would in fact include 8 lines (16 lines in the case of a 16 bit machine and so forth.

In the instant arrangement in the case data is transferred from the internal register 2' to the peripheral function register 6' (the internal and external buses being previously precharged), the control ROM 1a' outputs a control signal to the gate of the MOS-FET 9a' which renders the same ON. Data from the internal function register 2' is transferred to the internal bus 3' via the gates 7' and 8' which are also rendered ON. From the internal bus 3' the data enters the external bus 5' and is transferred into the peripheral function register 6' in the presence of a control signal from the control ROM 1a' appearing on the terminal 6a'. In this case, data from the internal register 2' is supplied to the internal and external buses via two separate directions.

Given that the resistances of the two paths are R1 and R2 respectively, the resistance developed between the internal and peripheral registers 2' and 6' can be represented as follows:

$$R = R1 \times R2 / R1 + R2 \ldots \quad (1)$$

Assuming that R1=R2 for the sake of explanation, it can be seen that the resistance of the arrangement shown in FIG. 6 is half that of an arrangement wherein data is transferred in one direction only. The same effect exists in the case data is transferred from the peripheral register 6' to the internal one 2'.

As will be appreciated this marked reduction in resistance enables data to be physically transferred with less resistance and therefore faster. The arrangement of the second embodiment of the present invention therefore enables data to be moved faster which in combination with the first embodiment which reduces the number of bus cycles necessary for any given data transfer. The combined effect is highly advantageous in promoting high speed processing by speeding up the rate with which data can be moved within the system.

What is claimed is:

1. In a microcomputer:
   a CPU, said CPU including a calculation unit and an internal bus for receiving data from said calculation unit;
   an external bus operatively connected to receive data from said internal bus;
   transmission gate means for controllably pre-charging and transferring data into said internal bus and said external bus with the same controlled timing, and for initializing said calculation unit and said internal bus on every bus cycle; and
   means for controlling the operation of said transmission gate means.

2. In a microcomputer:
   a CPU, said CPU including a first register and an internal bus, said internal bus having first and second ends;
   an external bus having first and second ends, said first external bus end being connected with the first end of said internal bus and said second external bus end being connected with the second end of said internal bus;

a second register operatively connected with said external bus;

transmission gate means for controllably transferring data between said first and second registers via said internal and external buses; and means for controlling the operation of said transmission gate means.

3. In a microcomputer;

a CPU, said CPU including a ALU and an internal bus for receiving data from said ALU, said internal bus having first and second ends;

an external bus, said external bus having first and second ends, the first end of said external bus being connected to the first end of said internal bus, and the second end of said internal bus being connected to the second end of said external bus;

transmission gate means for controllably pre-charging and transferring data into said internal bus and said external bus with the same timing, and for initializing said ALU and said internal bus on every bus cycle; and means for controlling the operation of said transmission gate means.

4. In a microcomputer:

an arithmetic logic unit (ALU) for performing calculations with data and providing said data as an output therefrom:

an internal bus for receiving said data from said ALU upon command;

an external bus for receiving data on said internal bus upon command;

a transmission gate connecting said internal bus with said external bus for controlling the transmission of data therebetween upon command;

a means for precharging upon command said external bus and said internal bus according to a first predetermined timing of each bus cycle;

controlling means for transferring data upon command from said internal bus into said ALU for calculating said data according to a second predetermined timing of a first bus cycle, occurring after said first predetermined timing, and for transferring data upon command from said ALU through said internal bus according to a second predetermined timing of a second bus cycle, occurring after said first predetermined timing.

5. The microcomputer as set forth in claim 4 above, further including:

means for initializing said ALU and said internal bus upon command for every bus cycle according to said first predetermined timing.

6. In a microcomputer having an ALU unit, an internal bus, and an external bus for transferring data from said ALU unit to said internal bus and then to said external bus, a circuit comprising:

transmission gate means for precharging and transferring data into said internal bus and said external bus with the same timing, said transmission gate means including a first gated switch operatively connecting said external bus with said internal bus to transfer data therebetween, said transmission gate means further including a second gated switch operatively connecting a precharge voltage to said external bus upon command and a third dated switch operatively connecting a precharge voltage to said internal bus upon command, and a fourth gated switch operatively controlling data transfer from said ALU unit to said internal bus; and means for controlling said first, said second, said third, and said fourth gated switches so that said same timing is provided.

7. The circuit as set forth in claim 6 further including initializing means responsive to said controlling means for initializing said ALU and said internal bus for each cycle of said controlling means.

8. In a microcomputer:

a CPU, said CPU including a first register and an internal bus, said internal bus having first and second ends;

an external bus for receiving data on said internal bus upon a command and having first and second ends, said first external bus end being directly connected with the first end of said internal bus through a first transmission gate means and said second external bus end being directly connected with the second end of said internal bus through a second transmission gate means;

a second register operatively connected with said external bus;

said first and second transmission gate means for controllably transferring data between said first and second registers via said internal and external busses; and means for controlling the operation of said first and second transmission gate means so as to transfer said data between said first and second registers via said internal and said external busses.

* * * * *